(12) United States Patent
Dayan et al.

(10) Patent No.: US 10,152,302 B2
(45) Date of Patent: Dec. 11, 2018

(54) CALCULATING NORMALIZED METRICS

(71) Applicant: HEWLETT PACKARD ENTERPRISE DEVELOPMENT LP, Houston, TX (US)

(72) Inventors: Gabriel Dayan, Yehud (IL); Eli Revach, Yehud (IL); Pavel Danichev, Yehud (IL); Avihay Mor, Yehud (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 53 days.

(21) Appl. No.: 15/404,599

(22) Filed: Jan. 12, 2017

(65) Prior Publication Data

US 2018/0196637 A1 Jul. 12, 2018

(51) Int. Cl.
*G06F 17/18* (2006.01)
*G06F 5/01* (2006.01)
*G06F 7/544* (2006.01)

(52) U.S. Cl.
CPC ............. *G06F 5/01* (2013.01); *G06F 7/544* (2013.01); *G06F 17/18* (2013.01)

(58) Field of Classification Search
None
See application file for complete search history.

(56) References Cited

U.S. PATENT DOCUMENTS

| 7,328,265 | B2 | 2/2008 | Anstey et al. |
| 8,688,620 | B2 | 4/2014 | Viswanathan et al. |
| 8,868,474 | B2 | 10/2014 | Leung et al. |
| 2005/0010312 | A1 | 1/2005 | Bodin et al. |
| 2005/0010376 | A1 | 1/2005 | Bodin et al. |
| 2011/0098973 | A1 | 4/2011 | Seidman |
| 2012/0136909 | A1 | 5/2012 | Wang et al. |
| 2013/0030761 | A1 | 1/2013 | Lakshminarayan et al. |
| 2013/0317888 | A1 | 11/2013 | Serrano et al. |
| 2013/0318567 | A1* | 11/2013 | Serrano ............... G06F 21/577 726/1 |
| 2014/0078464 | A1* | 3/2014 | Spratt ............... A61B 3/0025 351/205 |

(Continued)

OTHER PUBLICATIONS

Stack Exchange, Combining multiple metrics to provide comparisons/ranking of k objects [Question and Reference Request] dated on or before Sep. 7, 2015 (5 pages).

(Continued)

*Primary Examiner* — David H Malzahn

(57) ABSTRACT

Examples relate to calculating normalize metrics. The examples disclosed herein calculate respective normalized first metric values for each of a plurality of first metric values that are on a time scale and respective normalized second metric values for each of the plurality of raw second metric values that are on the time scale, where the plurality of first metric values are associated with a first metric, and the plurality of second metric values are associated with a second metric. An extremum of the normalized first metric value and the normalized second metric value at each time of the time scale is averaged to calculate a plurality of extremum baseline values. Examples herein calculate a plurality of sleeve values of the plurality of extremum baseline values based on a standard deviation of the plurality of extremum baseline values.

20 Claims, 8 Drawing Sheets

(56) References Cited

U.S. PATENT DOCUMENTS

| | | | | |
|---|---|---|---|---|
| 2014/0244343 | A1* | 8/2014 | Wilson | G06Q 10/0635 |
| | | | | 705/7.28 |
| 2015/0169795 | A1* | 6/2015 | ElBsat | G06F 17/5009 |
| | | | | 703/2 |
| 2016/0210556 | A1* | 7/2016 | Ben Simhon | G06F 11/07 |
| 2018/0060281 | A1* | 3/2018 | Horovitz | G06F 17/18 |
| 2018/0196637 | A1* | 7/2018 | Dayan | G06F 5/01 |

OTHER PUBLICATIONS

Lamontagne, L. et al., "Combining Multiple Similarity Metrics Using a Multicriteria Approach," (Web Page), European Conference on Case-Based Reasoning, Springer Berlin Heidelberg, 2006, pp. 415-428, http://www2.ift.ulaval.ca/~lamontagne/pubs/eccbr2006.pdf.

Sikdar, S. K., "On Aggregating Multiple Indicators Into a Single Metric for Sustainability," (Web Page), Clean Technologies and Environmental Policy 11.2, 2009, pp. 157-161, http://crawl.prod.proquest.com.s3.amazonaws.com/fpcache/97caa277c404feef6e14e6bbdef39ccf.pdf?AWSAccessKeyId=AKIAJF7V7KNV2KKY2NUQ&Expires=1475314332&Signature=HOTQ%2B$%2FHYlzYEYHsmjtUB18qAM%3D.

* cited by examiner

CALCULATING NORMALIZED METRICS

BACKGROUND

Computing systems can generic vast amounts of computing data, including metrics on performance. Computing systems can also gather and process computing performance data and various other forms of metrics. Multiple metrics can be compiled and presented to a user for identifying behaviors, patterns, etc.

BRIEF DESCRIPTION OF THE DRAWINGS

The following detailed description references the drawings, wherein.

DETAILED DESCRIPTION

Computing systems can gather and process computing performance data and various other forms of metrics. In some instances, computing systems may process numerous and large sets of metrics and data, which may utilize substantial system resources. Furthermore, different metrics may have values on different scales. As a result, it may be challenging to process, analyze, search, and otherwise handle multiple metrics. For example, a user may find it challenging to process multiple metrics to identify trends, outliers, predictions, etc.

Examples disclosed herein provide a tool that calculates normalized metric values for at least two metrics on a time scale, and calculates extremum baseline values and sleeve values based on the normalized metric values. This may facilitate the calculation of a master metric which allows efficient analysis of the underlying values and abnormalities. For example, a computing device disclosed herein may enable calculating respective normalized first metric values for each of a plurality of first metric values that are on a time scale and respective normalized second metric values for each of a plurality of second metric values that are on the time scale. The example computing device enables averaging an extremum of the normalized first metric value and the normalized second metric value at each time of the time scale to calculate a plurality of extremum baseline values. The example computing device enables calculating a plurality of sleeve values of the plurality of extremum baseline values based on a standard deviation of the plurality of extremum baseline values. In this manner, examples disclosed enable the calculation of master metrics to improve resource utilization and allow users to view and analyze a smaller amount of data.

Figure 1:
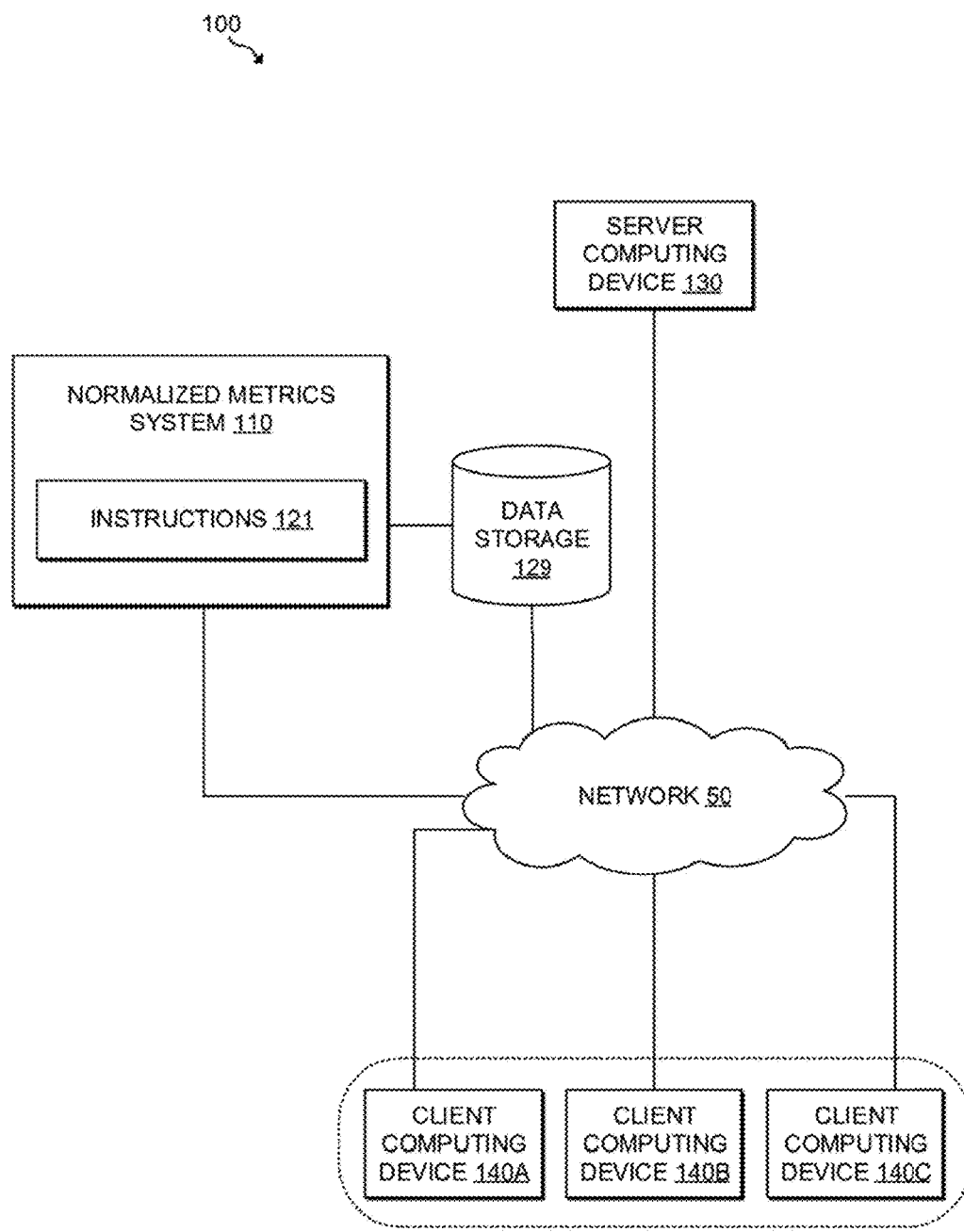
FIG. 1 is a flowchart of an example environment in which various examples may be implemented.

Referring now to the drawings, FIG. 1 is an example environment 100 in which various examples may be implemented as a normalized metrics system 110. As illustrated in the example of FIG. 1, environment 100 may include client (user) devices 140A, 1408, and 140C, and a server device 130. Each client device 140A-140C may be a computing device to communicate requests to and receive responses from server 130. Server device 130 represents a computing device capable of receiving and responding to requests from client devices 140A-140C. Client devices 140A-140C may be any type of computing device providing a user interface through which a user can interact with a software application. For example, client computing devices 140A-140C may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client devices 140A-140C. In some examples, the software application served by server device 130 may be a web application, which may be delivered to a user via a web client, such as a web browser via a network such as the internet.

The various components (e.g., components 110, 130, 140A-140C, etc.) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, normalized metrics system 110 and the various components described herein may be implemented in hardware and/or a combination of hardware and programming that configures hardware. Furthermore, in FIG. 1 and other Figures described herein, different numbers of components or entities than depicted may be used.

Server computing device 130 may serve an application for consumption by client devices 140A-140C. Users may interact with the application via user interfaces of client devices 140A-140C. Through the user interfaces, those users can take a number of actions including starting or opening a user session and interacting with user interface controls. As described in further detail herein, application events may occur as a result of those user actions. Events can include application launch, responses or results of such actions such user interface updates or changes in response to a selection of a control. Events can also include application faults such as errors and crashes.

Normalized metrics system 110 may represent a combination of hardware and programming for calculating normalized metrics which may be presented to users through client devices 140A-140C. For example, system 110 may include one or both of a processor and a machine-readable storage medium (i.e., instructions 121), while the programming is instructions or code stored on the machine-readable storage medium and executable by the processor to perform the designated function. In addition or in other examples, each engine may include a hardware device including electronic circuitry for implementing the functionality described below. In some examples, system 110 may generate a visual representation of normalized metrics and other information via a client device 140A-140C, as described in further detail herein.

Furthermore, the data (e.g., entities, trending topics, importance scores, suggested offerings, etc.) used in the functionality described in relation to system 140 may be stored in a data storage 129. A data storage 129 may include any recording media used to retain digital data, including semiconductor-based memory, magnetic storage, optical storage, etc. Data storage 129 may utilize both memory and storage, and may store data across a network of storage devices. Storage devices may be located on a computing device or distributed across multiple physical locations. In such instances, storage devices used by data storage 129 may be physically connected or linked together by a network such as network 50.

Normalized metrics system 110 may be integrated entirely in server computing device 130 or distributed across multiple server devices not shown. In other examples or in addition, system 110 may also be distributed across server device 130 and client devices 140A-140C. For example, system 110 may include agent components operating on client devices 140A-140C and calculation components operating on server computing device 130. In this example distributed model, the calculation components may calculate normalized metrics and related information and the agent components may be responsible for reporting the calculated data to users.

The term "component", as used with reference to system 110, may refer to a combination of hardware and programming that performs a designated function. For example, the hardware of each component, for example, may include one or both of a processor and a machine-readable storage medium, while the programming is instructions (i.e., instructions 121)) or code stored on the machine-readable storage medium and executable by the processor to perform the designated function. In addition or in other examples, each component may include a hardware device including electronic circuitry for implementing the functionality described below.

Figure 2:
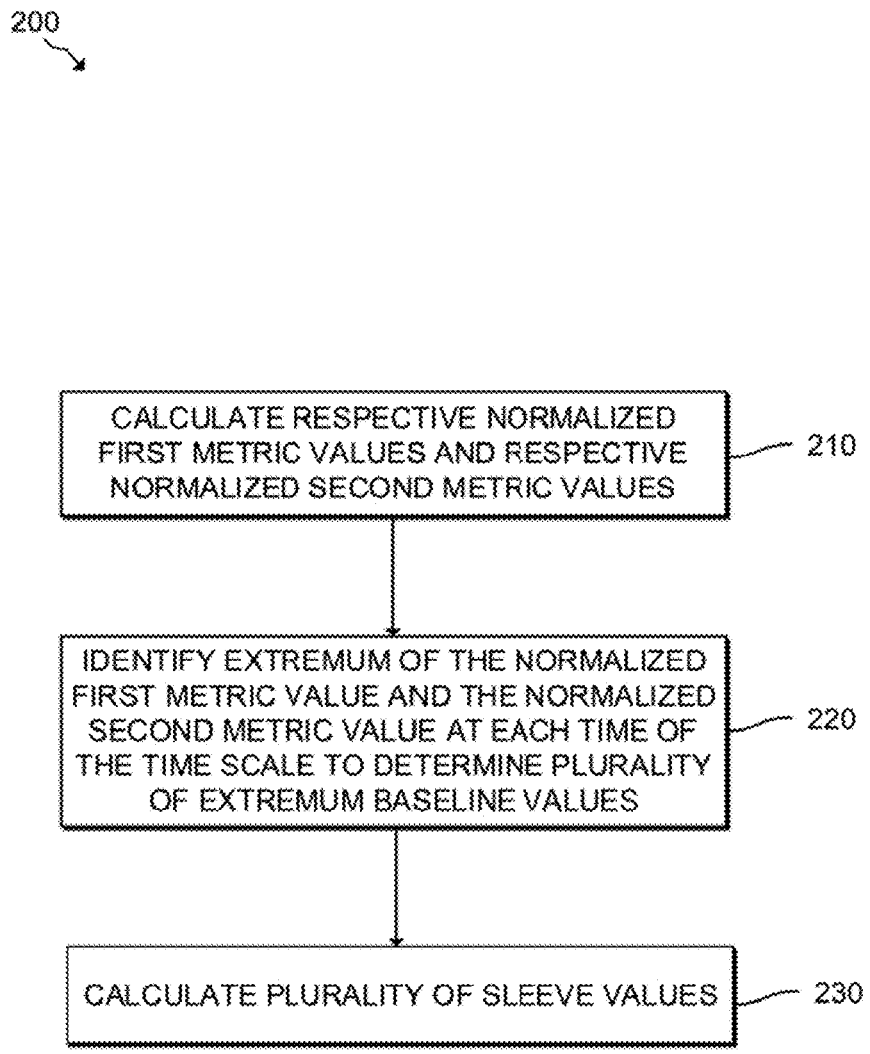
FIG. 2 is a flowchart of an example method for calculating normalized metrics.

FIG. 2 is a flowchart of an example method 200 for calculating normalized metrics. The various processing blocks and/or data flows depicted in FIG. 2 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 200 as illustrated (and described in greater detail below) is meant be an example and, as such, should not be viewed as limiting. Method 200 may be implemented in the form of executable instructions stored on a machine-readable storage medium, such as storage medium 320 described below with relation to computing device 300 of FIG. 3, and/or in the form of electronic circuitry.

In an operation 210, normalized first metric values for each of a plurality of first metric values on a time scale are calculated, and normalized second metric values for each of a plurality of second metric values on the time scale are calculated. The plurality of first metric values may be associated with a first metric, and the plurality of second metric values may be associated with a second metric. The first and second metrics may relate to various parameters or measures of quantitative assessment used for measurement, comparison, and/or to track performance or production. As an example, the first and second metrics may relate to performance metrics of a computing system, including server performance, data usage, etc. As another example, the metrics may relate to big data analytics for various applications settings.

The plurality of first metric values may include values of the first metric at each time of the time scale for a particular period of time. The times of the time scale may include any units of time. For example, each point may be made at each second or any specified period of time. The particular period of time may be, for example, the period during which data for the first metric was collected. Similarly, the plurality of second metric values may include values of the second metric at each time of the time scale for the particular period of time.

The plurality of first metric values and the plurality of second metric values may be normalized so that their values, which may be measured on different scales, may be adjusted to a common scale. The respective normalized first metric values and the respective normalized second metric values may represent the first metric and the second metric on a notionally common order of magnitude on the same time scale. In such a manner, extremums of the metrics and outlier values may be easily identified, which is further described below.

In some examples, each normalized first metric value is calculated based on comparing a difference between a first metric value and an average first metric value with a standard deviation of the plurality of first metric values. Similarly, each normalized second metric value is calculated based on comparing a difference between a second metric value and an average second metric value with a standard deviation of the plurality of second metric values. An example calculation for a normalized metric value may be represented as following example Equation 1.

$$V_t = \frac{x_t - \bar{x}}{\sigma}$$

In the illustration of Equation 1, $V_t$ is the normalized metric value (i.e., normalized first metric value or normalized second metric value) at a time t on a time scale. $x_t$ is the metric value at time t, $\bar{x}$ is the average of the previous metric values of the metric (i.e., previous processed values of the plurality of first metric values), and $\sigma$ is their standard deviation. In some examples, $\bar{x}$ and $\sigma$ of each metric may be calculated and updated in an online additive-adaptive method that resembles exponential moving average. Furthermore, $\bar{x}$ may be calculated based on a forgetting factor. An example calculation for $\bar{x}$ may be represented as following example Equation 2.

$$\bar{x}_t = (1-\alpha)\bar{x}_{t-1} + \alpha x_t$$

In the illustration of Equation 2, $x_t$ may be the current metric value, $\bar{x}_{t-1}$ is the previous average metric value, and $\alpha$ is a forgetting factor. A forgetting factor may be a coefficient which accounts for respective weights of a current metric value and a previous average metric value when calculating for a current average metric value. A forgetting factor may, in some examples, be dynamically adjusted to variable sample rates, which may allow, for example, a half-life period to be constant for metrics with varying sample rates. An example calculation for a forgetting factor α may be represented as following example Equation 3.

$$\alpha_t = 1 - W_p^{\frac{\Delta T_t}{p}}$$

In the illustration of Equation 3, $W_p$ may be a desirable weight of values prior to a particular time period of interest. For example, $W_p$ may be set as 0.5 for the prior values to have a half-life. p may be a length of the particular time period of interest (in time units), and $$\frac{\Delta T_t}{p}$$

may be a time interval between a time stamp of a current metric value and a time stamp of a previous metric value.

In some examples, a standard deviation of the plurality of first metric values may be calculated based on a square of the average first metric value and an average of squares of the plurality of first metric values. Similarly, a standard deviation of the plurality of second metric values may be calculated based on a square of the average second metric value and an average of squares of the plurality of second metric values. For example, the average metric values and the squares of metric values may be stored as metadata in a system such as normalized metrics system 110. An example calculation for a standard deviation of metric values may be represented as following example Equation 4.

$$\sigma = \sqrt{\overline{x^2} - \overline{x}^2}$$

In the illustration of Equation 4, σ is the standard deviation, $\overline{x^2}$ is the average of the squares of metric values, and $\overline{x}^2$ is the square of the average metric values. An example calculation for an average of the squares of metric values may be represented as following example Equation 5.

$$\overline{(x^2)}_t = (1-\alpha)\overline{(x^2)}_{t-1} + \alpha(x_t^2)$$

In the illustration of Equation 5, α is a forgetting factor, which may be, in some examples, the forgetting factor related to example Equation 2. In such a manner as illustrated above with relation to Equations 1-5, normalized first metric values for each of a plurality of first metric values on a time scale may be calculated, and normalized second metric values for each of a plurality of second metric values on the time scale may be calculated.

In an operation 220, a plurality of extremum baseline values may be determined by identifying an extremum of the normalized first metric value and the normalized second metric value at each time of the time scale. An extremum may be a maximum or minimum value of a function, and may be identified by determining the maximum and/or minimum between the first normalized metric value and the second normalized metric value at each time of the time scale. In some examples, the plurality of extremum baseline values may include a maximum of the two metrics at each time. In other examples, the plurality of extremum baseline values may include a minimum of the two metrics at each time. Furthermore, in some examples, both maximums and minimums may be included at each time of the time scale.

In an operation 230, a plurality of sleeve values of the plurality of extremum baseline values may be calculated. Sleeve values may provide a range of expected behavior of metric values. For example, sleeve values may be calculated based on a variety of factors, including mean, standard deviation, and trend of the extremum baseline values. In some examples, a sleeve value may represent an average of the plurality of baseline values for a particular period of time on a time scale. Thus, the plurality of sleeve values may include multiple average values, each representing the average extremum values for a respective period of time on the time scale.

In some examples, method 200 may include additional operations. As an example, an outlier value may be identified by identifying at least one of the plurality of extremum baseline values that is beyond a threshold value of the sleeve value at a corresponding time of the time scale. Additionally, problematic metrics may be identified base on the outlier value. These additional operations are further described in detail below.

Furthermore in some examples, method 200 may include an operation or operations to present the plurality of extremum baseline values and the plurality of sleeve values to a user. For example, the extremum baseline values and the sleeve values may be presented via a user interface on a client device 140A-140C. Furthermore, the operations of method 200 and/or or other related operations may be displayed to a user via the user interface. Accordingly a user may be able to visualize the operations performed relating to the first metric and the second metric. Examples of graphic representations of these operations are described in further detail herein with relation to FIG. 5 and FIG. 6.

Moreover, various actions may be taken using the first metric, the second metric, the normalized metric values, the extremum baseline values, and/or the sleeve values. For example, a first metric may be a first computer performance metric (e.g., central processing unit (CPU) usage of a computing device in an IT environment) and a second metric may be a second computer performance metric (e.g., memory usage of the computing device). The first metric and the second metric may be used to calculate normalized metric values, which may be displayed to a user through a user interface. The normalized first and second metrics may then be used to identify extremum baseline values to identify the extremums at each point in time of a particular time period under examination. Furthermore, determining sleeve values for the extremum baseline values may then create a threshold value, beyond which outlier metric values may be identified. Based on the outlier values identified, anomalous metrics may be identified at the particular times where the outliers are found. Accordingly, actions may be taken, automatically or by a user, in the IT environment in response to the identified anomalous metrics. For example, automatic remedial and/or preventative measures may be taken.

It should be noted that while method 200 describes operations relating to the calculation of normalized metrics for a first metric and a second metric, method 200 can be applied to any number of multiple metrics, as illustrated below in reference to FIGS. 5A-5B and FIGS. 6A-6B.

Figure 3:
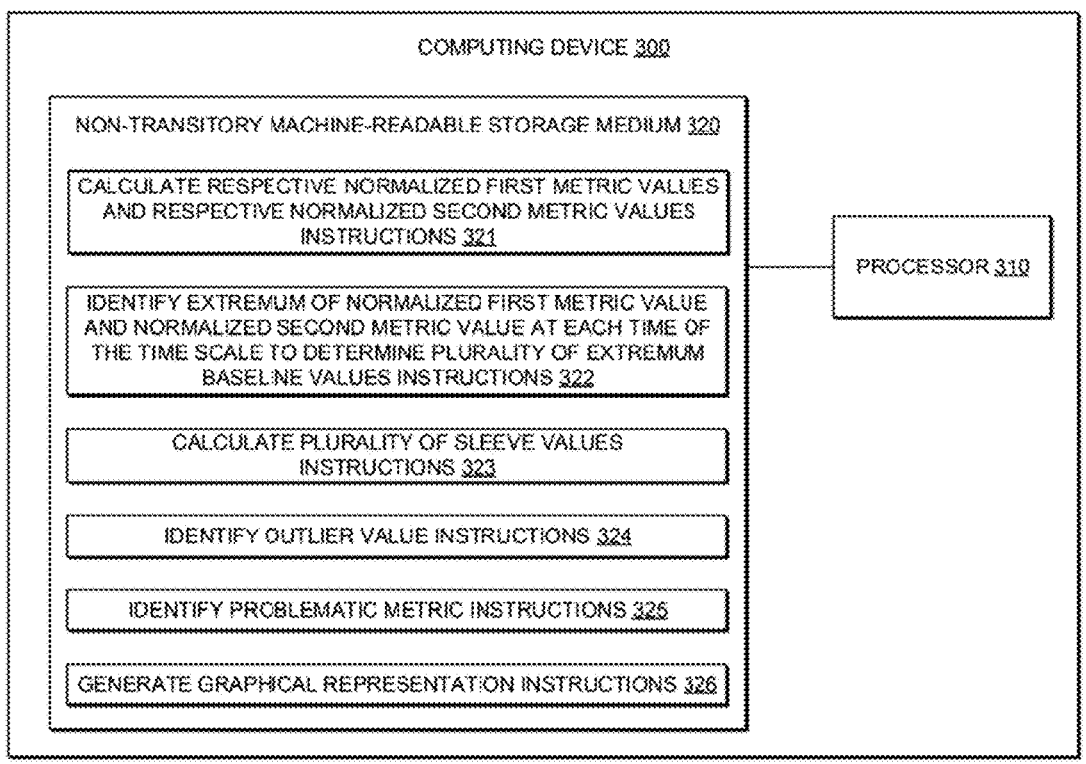
FIG. 3 is a block diagram of a first example computing device for calculating normalized metrics.

FIG. 3 shows a block diagram depicting a first example computing device 300 for calculating normalized metrics. Computing device 300 may include a server, cloud-based server, laptop computing device, a desktop computing device, an all-in-one computing device, a tablet computing device, a mobile phone, an electronic book reader, a network-enabled appliance such as a "Smart" television, and/or other electronic device suitable for the functions described herein. Computing device 300 may, for example, be analogous to server computing device 130 of FIG. 1.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321, 322, 323, 324, 325, 326, and/or other instructions. In other examples or in addition to retrieving and executing instructions, processor 310 may include at least one electronic circuit comprising a number of electronic components for performing the functionality of at least one of instructions 321, 322, 323, 324, 325, 326, and/or other instructions.

Machine-readable storage medium 320 may be any electronic, magnetic, optical, or other physical storage device that contains or stores executable instructions. In some implementations, machine-readable storage medium 320 may be a non-transitory storage medium, where the term "non-transitory" does not encompass transitory propagating signals. Machine-readable storage medium 320 may be implemented in a single device or distributed across devices. Likewise, processor 310 may represent any number of processors capable of executing instructions stored by machine-readable storage medium 320. Processor 310 may be integrated in a single device or distributed across devices. Further, machine-readable storage medium 320 may be fully or partially integrated in the same device as processor 310, or it may be separate but accessible to that device and processor 310.

In one example, the program instructions may be part of an installation package. In this case, machine-readable storage medium 320 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 may include a hard disk, optical disk, tapes, solid state drives, RAM, ROM, EEPROM, or the like.

When executed by processor 310, instructions 321, 322, 323, 324, 325, and 326 may respectively cause computing device 300 to implement blocks 210, 220, 230 and other operations of method 200, or analogues thereof. Accordingly, computing device 300 may calculate respective normalized first metric values and respective normalized second metric values, identify an extremum of the normalized first metric values and the normalized second metric values at each time of a time scale to determine a plurality of extremum baseline values, calculate a plurality of sleeve values, identify outlier values, identify problematic metrics based on the outlier values, and generate a graphical representation.

In response to execution by processor 310, instructions 321 may cause the processor 310 to calculate respective normalized first metric values for each of a plurality of first metric values that are on a time scale and respective normalized second metric values for each of a plurality of second metric values that are on the time scale. The plurality of first metric values are associated with a first computing metric, and the plurality of second metric values are associated with a second computing metric. For example, a computing metric may be related to computing performance, usage, etc.

In response to execution by processor 310, instructions 322 may cause the processor 310 to identify an extremum of the normalized first metric value and the normalized second metric value at each time of the time scale to determine a plurality of extremum baseline values. As described above, an extremum may be a maximum or minimum value of a function, and may be identified by determining the maximum and/or minimum between the first normalized metric value and the second normalized metric value at each time of the time scale. In some examples, both a maximum and minimum at each time may be identified.

In response to execution by processor 310, instructions 323 may cause the processor 310 to determine a plurality of sleeve values of the plurality of extremum baseline values. As described above, sleeve values may provide a range of expected behavior of metric values. For example, sleeve values may be calculated based on a variety of factors, including mean, standard deviation, and trend of the extremum baseline values. In some examples, a sleeve value may represent an average of the plurality of baseline values for a particular period of time on a time scale.

In response to execution by processor 310, instructions 324 may cause the processor 310 to identify an outlier value by identifying at least one of the plurality of extremum baseline values that is beyond a threshold value of the sleeve value at a corresponding time of the time scale. An outlier value may be one which is variable in measurement from the rest of the extremum baseline values. Because the plurality of extremum baseline values already represent the maximum or minimum of the two normalized metrics at each time of the time scale, and because the sleeve values are determined based on the extremum values, any identified outlier values may be unusual data points within the metrics measured. The threshold value of the sleeve values may be considered for instances when the extremum is a maximum and/or for instances when the extremum is a minimum. For example, outliers may be values less than a minimum sleeve value, or outliers may be values greater than a maximum sleeve value. In either cases, the outliers may be beyond a threshold value.

In response to execution by processor 310, instructions 325 may cause the processor 310 to identify a problematic metric based on the outlier value. As described in the preceding, outlier values may represent unusually high or low values among the extremum baseline values. These values may represent a problematic (i.e., anomalous) metric at these values. Accordingly, the particular metric (i.e., first metric or second metric) that produced the outlier value may be identified as the problematic metric. In this manner, anomalous results of reported metrics may be effectively distinguished.

Furthermore in response to execution by processor 310, instructions 326 may cause the processor 310 to generate a graphical representation for presenting the plurality of extremum baseline values and the plurality of sleeve values to a user. For example, the values may be presented to a user via client devices 140A-140C in the environment 100 illustrated in FIG. 1. In some examples, the graphical representation may include the plurality of extremum baseline values determined in response to the execution of instructions 322 and the plurality of sleeve values calculated in response to the execution of instructions 323. The extremum baseline values and the plurality of sleeve values may be aligned with a first axis representing the time scale (e.g., x-axis) and a second axis representing normalized metric values (e.g., y-axis).

Figure 4:
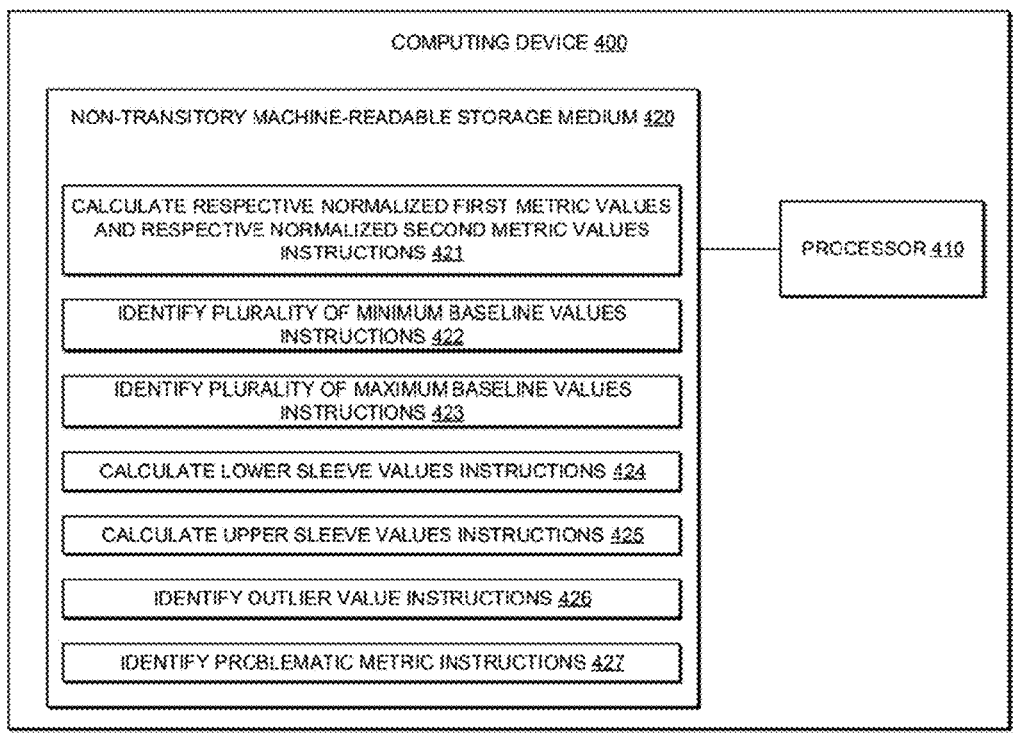
FIG. 4 is a block diagram of a second example computing device for calculating normalized metrics.

FIG. 4 is a block diagram depicting a second example computing device 400 for calculating normalized metrics.

Similarly to computing device 300 of FIG. 3, second computing device 400 may include a processor 310 and a non-transitory machine-readable storage medium 420. Storage medium 420 may include instructions 421-427 for calculating normalized metric values of a first and second metric, calculating minimum and maximum baseline values, calculating lower and upper sleeve values, and identifying outlier values and a problematic metric.

In response to execution by processor 410, instructions 421 may cause the processor 410 to calculate respective normalized first metric values for each of a plurality of first metric values that are on a time scale and respective normalized second metric values for each of a plurality of second metric values that are on the time scale. The plurality of first metric values are associated with a first computing metric, and the plurality of second metric values are associated with a second computing metric. For example, a computing metric may be related to computing performance, usage, etc. In some examples, normalized metric values may be calculated for more than two metrics.

In response to execution by processor 410, instructions 422 and 423 may respectively cause the processor 410 to identify a minimum and maximum of the normalized first metric value and the normalized second metric value at each time of the time scale to determine a plurality of minimum baseline values and a plurality of maximum baseline values.

In response to execution by processor 410, instructions 424 and 425 may respectively cause the processor 410 to calculate a plurality of lower sleeve values of the plurality of minimum baseline values and a plurality of upper sleeve values of the plurality of maximum baseline values. Since sleeve values may provide a range of expected behavior of metric values, the lower sleeve values and upper sleeve values may represent a range of expected values for the normalized metrics.

In response to execution by processor 410, instructions 426 may cause the processor 410 to identify an outlier value by identifying at least one of the plurality of minimum baseline values that is less than the lower sleeve value at a corresponding time of the time scale or at least one of the plurality of maximum baseline values that is greater than the upper sleeve value at a corresponding time of the time scale. Thus, an outlier value may be one which falls outside of the expected values indicated by the upper and lower sleeve values. Based on the outlier value identified in response to the execution of instructions 426, instructions 427, in response to execution by processor 410, may cause to identify a problematic metric.

Figure 5A:
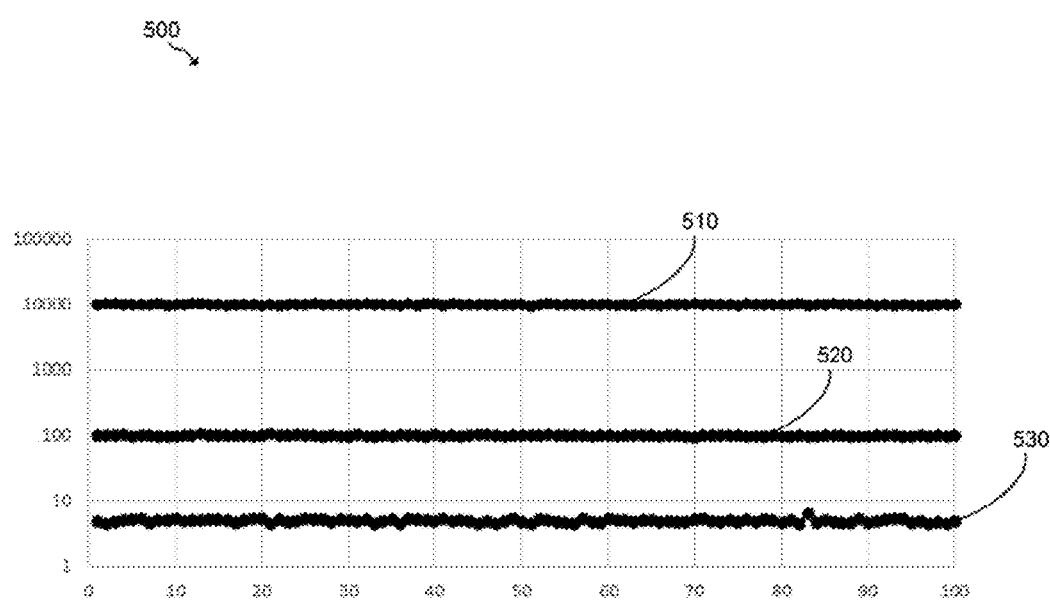
FIG. 5A is a schematic diagram depicting an example graphical representation of example metrics.

FIG. 5A is a schematic diagram depicting an example graphical representation 500. For example, graphical representation 500 may be presented to a user via client devices 140A-140C in environment 100. Graphical representation 500 may illustrate three example metrics (first metric 510, second metric 520, and third metric 530), where the plurality of each metric's values are positioned on a graph having a y-axis showing raw metric values on a logarithmic scale and an x-axis showing a linear time scale. As illustrated, the three metrics have raw values on different orders of magnitude. Accordingly, in the illustration of FIG. 5A, each of the metrics appear as relatively straight horizontal lines.

Figure 5B:
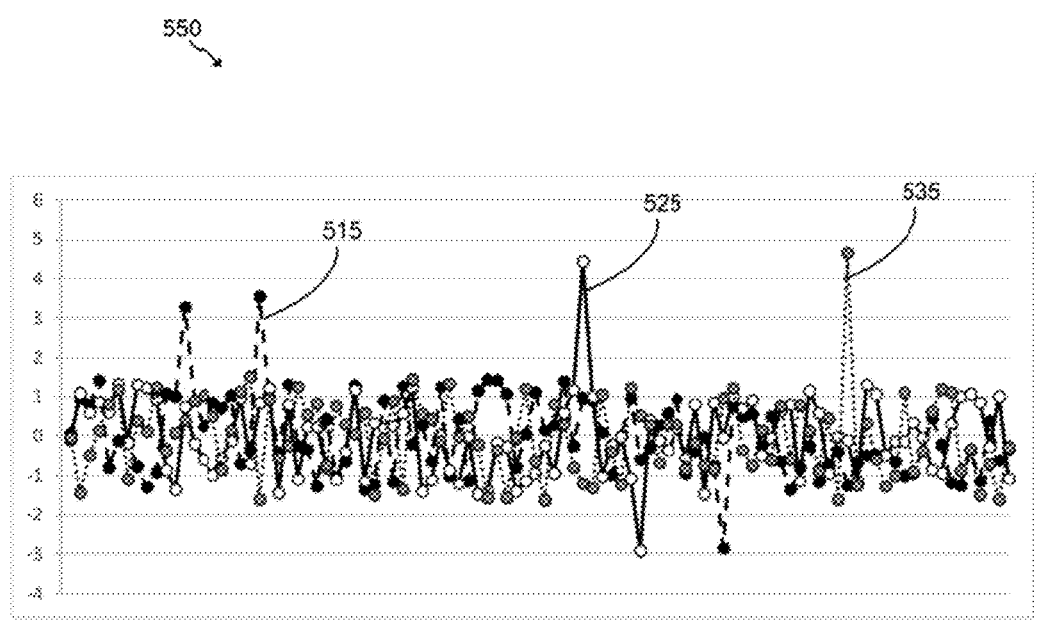
FIG. 5B is a schematic diagram depicting an example graphical representation of example normalized metrics of the example metrics.

FIG. 5B is a schematic diagram depicting an example graphical representation 550. Similar to the example of FIG. 5A, graphical representation 550 may be presented to a user via client devices 140A-140C in environment 100. Graphical representation 550 may illustrate three example normalized metrics (normalized first metric 515, normalized second metric 525, and normalized third metric 535), where the plurality of each normalized metric's values are positioned on a graph having a y-axis showing normalized metric values on a linear scale and an x-axis showing the linear time scale. For example, the normalized metric values 515, 525, and 535 may have been calculated from metric values 510, 520, 530 illustrated in FIG. 5A by operations such as those described in example operation 210 of method 200 and by execution of example instructions 321 and 421 of computing devices 300 and 400, respectively.

Figure 6A:
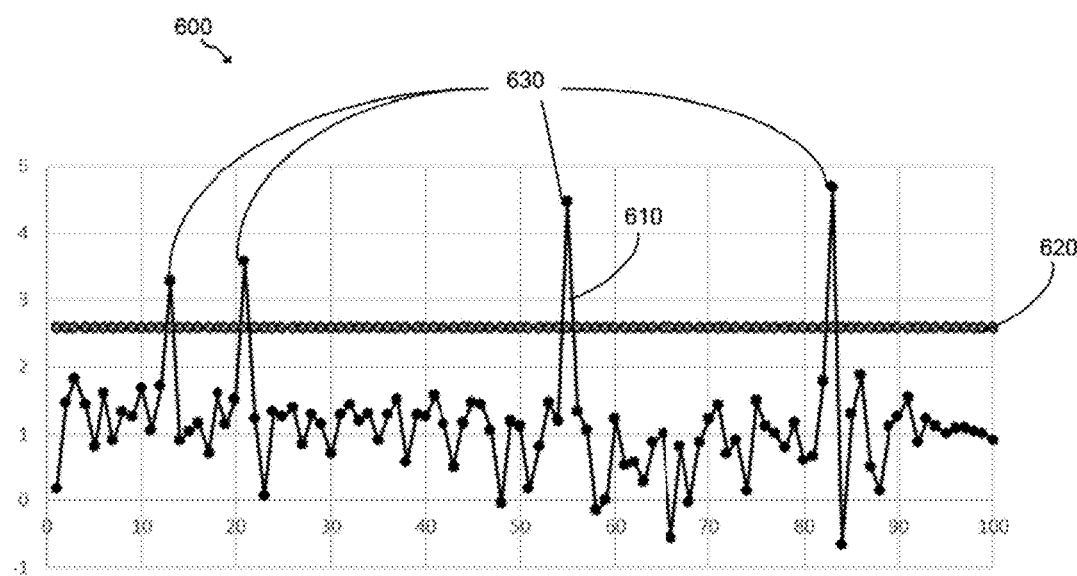
FIG. 6A is a schematic diagram depicting an example graphical representation of example extremum values and sleeve values of example normalized metrics.

FIG. 6A is a schematic diagram depicting an example graphical representation 600 of example extremum values and sleeve values of example normalized metrics. For example, graphical representation 600 may illustrate a plurality of maximum baseline values 610 and a plurality of upper sleeve values 620. For example, the plurality of maximum baseline values 610 may have been identified from normalized metric values 515, 525, and 535 illustrated in FIG. 5B by operations such as those described in example operation 220 of method 200 and by execution of example instructions 322 and 423 of computing devices 300 and 400, respectively. Similarly, the upper sleeve values 620 may have been calculated from maximum baseline values 610 by operations such as those described in example operation 230 of method 200 and by execution of example instructions 323 and 435 of computing devices 300 and 400, respectively. Furthermore, graphical representation 600 may illustrate outlier values 630 that are greater than the upper sleeve values 620.

Figure 6B:
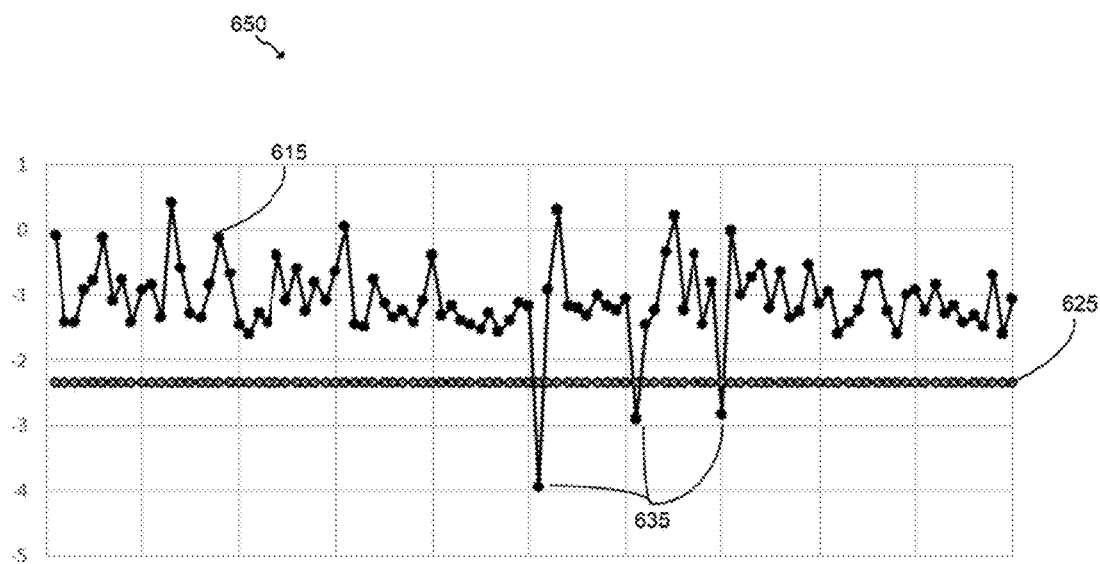
FIG. 6B is a schematic diagram depicting an example graphical representation of second example extremum values and sleeve values of example normalized metrics.

FIG. 6B is a schematic diagram depicting an example graphical representation 650 of second example extremum values and sleeve values of example normalized metrics. For example, graphical representation 650 may illustrate a plurality of minimum baseline values 615 and a plurality of lower sleeve values 625. For example, the plurality of minimum baseline values 615 may have been identified from normalized metric values 515, 525, and 535 illustrated in FIG. 5B by operations such as those described in example operation 220 of method 200 and by execution of example instructions 322 and 422 of computing devices 300 and 400, respectively. Similarly, the lower sleeve values 625 may have been calculated from minimum baseline values 615 by operations such as those described in example operation 230 of method 200 and by execution of example instructions 323 and 424 of computing devices 300 and 400, respectively. Furthermore, graphical representation 600 may illustrate outlier values 635 that are less than the lower sleeve values 625.

The foregoing disclosure describes a number of examples for calculating normalized metrics. The disclosed examples may include systems, devices, computer-readable storage media, and methods for performing the functions taught herein. For purposes of explanation, certain examples are described with reference to the components illustrated in FIGS. 1-6. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The terminology used herein is for the purpose of describing particular examples and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are used to distinguish one element from another unless stated otherwise or the context indicates otherwise. As used herein, the term "includes" means includes but not limited to, the term "including" means including but not limited to. The term "based on" means based at least in part on.

What is claimed is:

1. A method executed by a computing device, comprising:
calculating respective normalized first metric values for each of a plurality of first metric values that are on a time scale and respective normalized second metric values for each of a plurality of second metric values that are on the time scale, wherein the plurality of first metric values are associated with a first metric, and the plurality of second metric values are associated with a second metric;
identifying an extremum of the normalized first metric value and the normalized second metric value at each time of the time scale to determine a plurality of extremum baseline values;
determining a plurality of sleeve values of the plurality of extremum baseline values;
identifying an anomaly in a computing system based on the plurality of extremum baseline values and the plurality of sleeve values; and
in response to the identifying of the anomaly, performing an automated remedial action to address the anomaly in the computing system.

2. The method of claim 1, further comprising identifying an outlier value by identifying at least one of the plurality of extremum baseline values that is beyond a threshold value of the sleeve value at a corresponding time of the time scale.

3. The method of claim 2, further comprising identifying a problematic metric based on the outlier value, the problematic metric corresponding to the anomaly.

4. The method of claim 2, wherein:
the plurality of extremum baseline values comprises a maximum of the normalized first metric value and the normalized second metric value at each time of the time scale;
the plurality of sleeve values comprises a plurality of upper sleeve values; and
the outlier value is identified by identifying at least one of the plurality of maximum baseline values that is greater than the upper sleeve value at a corresponding time of the time scale.

5. The method of claim 2, wherein:
the plurality of extremum baseline values comprises a minimum of the normalized first metric value and the normalized second metric value at each time of the time scale;
the plurality of sleeve values comprises a plurality of lower sleeve values; and
the outlier value is identified by identifying at least one of the plurality of minimum baseline values that is less than the lower sleeve value at a corresponding time of the time scale.

6. The method of claim 1, wherein:
calculating each normalized first metric value is based on comparing a difference between a first metric value and an average first metric value with a standard deviation of the plurality of first metric values;
calculating each normalized second metric value is based on comparing a difference between a second metric value and an average second metric value with a standard deviation of the plurality of second metric values; and
the average first metric value and the average second metric value are calculated based on a forgetting factor.

7. The method of claim 6, wherein:
the standard deviation of the plurality of first metric values is calculated based on a square of the average first metric value and an average of squares of the plurality of first metric values; and
the standard deviation of the plurality of second metric values is calculated based on a square of the average second metric value and an average of squares of the plurality of second metric values.

8. The method of claim 1, further comprising:
in addition to performing the automated remedial action, presenting the plurality of extremum baseline values and the plurality of sleeve values to a user.

9. The method of claim 8, further comprising generating a graphical representation comprising the plurality of extremum baseline values and the plurality of sleeve values aligned with a first axis representing the time scale and a second axis representing normalized metric values.

10. The method of claim 1, wherein the first metric is a first computer performance metric and the second metric is a second computer performance metric.

11. A non-transitory machine-readable storage medium encoded with instructions that upon execution cause a computing device to:
calculate respective normalized first metric values for each of a plurality of first metric values that are on a time scale and respective normalized second metric values for each of a plurality of second metric values that are on the time scale, wherein the plurality of first metric values are associated with a first computing metric, and the plurality of second metric values are associated with a second computing metric;
identify an extremum of the normalized first metric value and the normalized second metric value at each time of the time scale to determine a plurality of extremum baseline values; and
determine a plurality of sleeve values of the plurality of extremum baseline values;

identify an outlier value by identifying at least one of the plurality of extremum baseline values that is beyond a threshold value of the sleeve value at a corresponding time of the time scale;

identify a problematic metric based on the outlier value, the problematic metric representing an anomaly in a computing system; and cause performance of an automated remedial action to address the anomaly in the computing system.

12. The non-transitory machine-readable storage medium of claim 11, wherein:

the plurality of extremum baseline values comprises a maximum of the normalized first metric value and the normalized second metric value at each time of the time scale;

the plurality of sleeve values comprises a plurality of upper sleeve values; and the outlier value is identified by identifying at least one of the plurality of maximum baseline values that is greater than the upper sleeve value at a corresponding time of the time scale.

13. The non-transitory machine-readable storage medium of claim 11, wherein:

the plurality of extremum baseline values comprises a minimum of the normalized first metric value and the normalized second metric value at each time of the time scale;

the plurality of sleeve values comprises a plurality of lower sleeve values; and the outlier value is identified by identifying at least one of the plurality of minimum baseline values that is less than the lower sleeve value at a corresponding time of the time scale.

14. The non-transitory machine-readable storage medium of claim 11, wherein:

each normalized first metric value is calculated based on comparing a difference between a first metric value and an average first metric value with a standard deviation of the plurality of first metric values;

each normalized second metric value is calculated based on comparing a difference between a second metric value and an average second metric value with a standard deviation of the plurality of second metric values; and the average first metric value and the average second metric value are calculated based on a forgetting factor.

15. The non-transitory machine-readable storage medium of claim 14, wherein:

the standard deviation of the plurality of first metric values is calculated based on a square of the average first metric value and an average of squares of the plurality of first metric values; and the standard deviation of the plurality of second metric values is calculated based on a square of the average second metric value and an average of squares of the plurality of second metric values.

16. The non-transitory machine-readable storage medium of claim 11, wherein the instructions upon execution cause the computing device to generate a graphical representation comprising the plurality of extremum baseline values and the plurality of sleeve values aligned with a first axis representing the time scale and a second axis representing normalized metric values.

17. A computing device comprising:

a processor; and a non-transitory storage medium storing instructions executable on the processor to:

calculate respective normalized first metric values for each of a plurality of first metric values that are on a time scale and respective normalized second metric values for each of a plurality of second metric values that are on the time scale, wherein the plurality of first metric values are associated with a first metric, and the plurality of second metric values are associated with a second metric;

identify extremum of the normalized first metric value and the normalized second metric value at each time of the time scale to determine a plurality of extremum baseline values; and calculate a plurality of sleeve values of the plurality of extremum baseline values;

identify an outlier value by identifying at least one of the plurality of minimum baseline values that is beyond the sleeve value at a corresponding time of the time scale;

identify a problematic metric based on the outlier value, the problematic metric representing an anomaly in a computing system; and cause performance of an automated remedial action to address the anomaly in the computing system.

18. The computing device of claim 17, wherein:

each normalized first metric value is calculated based on comparing a difference between a first metric value and an average first metric value with a standard deviation of the plurality of first metric values;

each normalized second metric value is calculated based on comparing a difference between a second metric value and an average second metric value with a standard deviation of the plurality of second metric values; and the average first metric value and the average second metric value are calculated based on a forgetting factor.

19. The computing device of claim 18, wherein:

the standard deviation of the plurality of first metric values is calculated based on a square of the average first metric value and an average of squares of the plurality of first metric values; and the standard deviation of the plurality of second metric values is calculated based on a square of the average second metric value and an average of squares of the plurality of second metric values.

20. The computing device of claim 17, wherein the instructions are executable on the processor to generate a graphical representation comprising the plurality of extremum baseline values and the plurality of sleeve values aligned with a first axis representing the time scale and a second axis representing normalized metric values.

* * * * *